No. 614,045. Patented Nov. 8, 1898.
L. J. WENTZEL.
CHAIN WHEEL FOR CYCLES.
(Application filed Feb. 18, 1898.)
(No Model.)
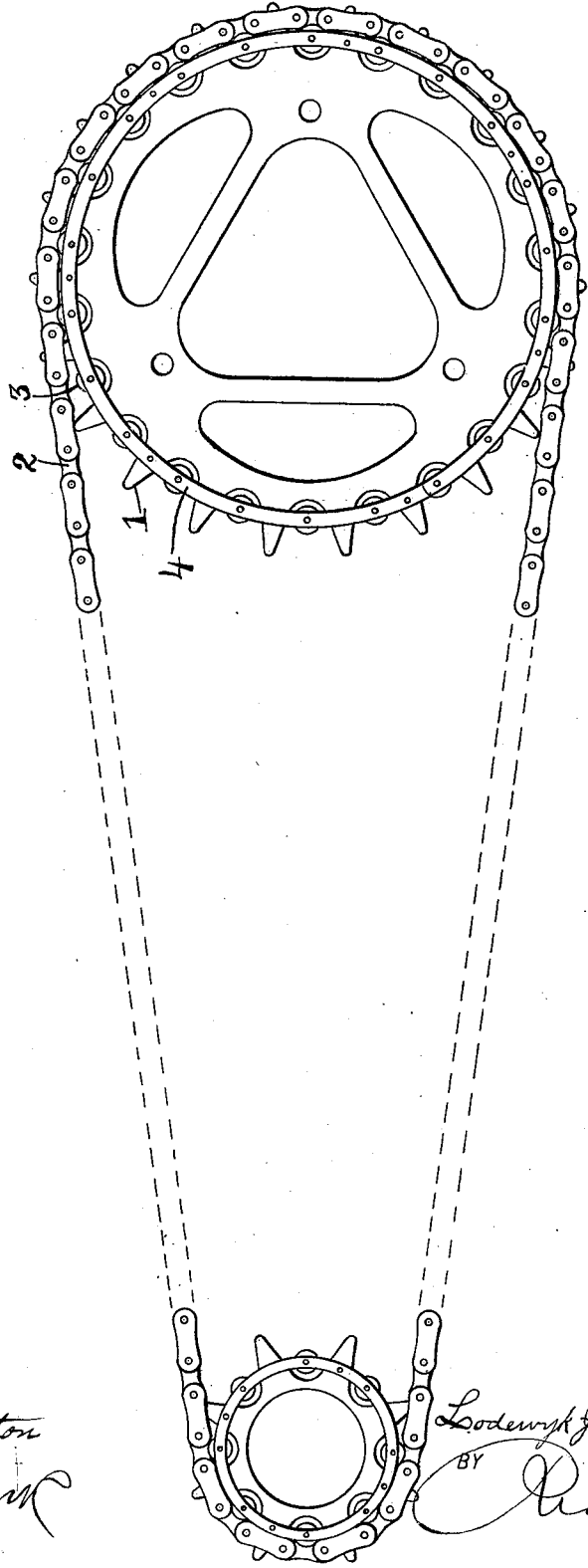
WITNESSES:
INVENTOR
Lodewyk Johannes Wentzel
BY
ATTORNEYS
THE NORRIS PETERS CO., PHOTO-LITHO., WASHINGTON, D. C.

UNITED STATES PATENT OFFICE.

LODEWYK JOHANNES WENTZEL, OF CAPE TOWN, CAPE COLONY.

CHAIN-WHEEL FOR CYCLES.

SPECIFICATION forming part of Letters Patent No. 614,045, dated November 8, 1898.

Application filed February 18, 1898. Serial No. 670,776. (No model.)

*To all whom it may concern:*

Be it known that I, LODEWYK JOHANNES WENTZEL, sign-writer, a subject of Her Britanic Majesty, residing at 40 Wale street, Cape Town, Cape Colony, have invented a certain new and Improved Chain-Wheel for Cycles, applicable to both the crank-wheel and the driving-wheel (hub-ring) thereof, (for which Letters Patent have been granted to me by the government of the Colony of the Cape of Good Hope, dated October 19, 1897, No. 1,446,) of which the following is a specification.

My invention relates to sprocket-wheels for bicycles and the like; and it consists in combining with a sprocket-wheel having teeth to enter the spaces of the chain a series of rollers arranged between the teeth to bear on the blocks of the chain.

The accompanying drawing shows the invention in elevation.

The chain or sprocket wheel has teeth 1 to enter the spaces between the links of the chain, said links being connected by blocks 2 in the ordinary manner. In order to afford bearings for the blocks between the teeth of the chain, I employ a series of rollers 3, arranged in the spaces between the teeth. These rollers are carried by a ring 4, extending around the wheel alongside of the lateral faces of the teeth. As the chain passes around the wheel the blocks thereof bear on these rolling parts, thus reducing wear and friction.

I claim—

1. In combination with the chain, a chain-wheel having teeth to extend into the spaces between the links and the rollers in the spaces between said teeth to bear on the blocks of the chain, substantially as described.

2. In combination with a chain-wheel having teeth the rollers between the teeth and the ring carrying the rollers, substantially as described.

Signed this 12th day of January, 1898.

LODEWYK JOHANNES WENTZEL.

Witnesses:
DOUGLAS ALVANLEY ARDERNE,
CHARLES FRERIC R. BROWN.